(12) United States Patent
Seimann (10) Patent No.: US 10,598,275 B2
(45) Date of Patent: Mar. 24, 2020

(54) GEAR-CHANGING APPARATUS FOR ACTUATING A MANUAL GEARBOX OF A MOTORCYCLE FOR CARRYING OUT A GEAR CHANGE WITH THE CLUTCH ENGAGED

(71) Applicant: KTM AG, Mattighofen (AT)

(72) Inventor: Johannes Seimann, Bad Ischl (AT)

(73) Assignee: KTM AG, Mattighofen (AT)

( * ) Notice: Subject to any disclaimer, the term of this patent is extended or adjusted under 35 U.S.C. 154(b) by 390 days.

(21) Appl. No.: 15/247,684

(22) Filed: Aug. 25, 2016

(65) Prior Publication Data

US 2017/0067555 A1 Mar. 9, 2017

(30) Foreign Application Priority Data

Aug. 28, 2015 (DE) .......................... 10 2015 114338

(51) Int. Cl.
*F16H 59/00* (2006.01)
*F16H 59/04* (2006.01)
(Continued)

(52) U.S. Cl.
CPC .......... *F16H 59/044* (2013.01); *B62K 23/08* (2013.01); *B62M 25/06* (2013.01); *F02D 41/023* (2013.01); *F16H 63/50* (2013.01); *F16H 63/502* (2013.01); *B60W 2710/0666* (2013.01); *B60Y 2200/12* (2013.01); *F16H 2059/026* (2013.01); *F16H 2059/0234* (2013.01); *F16H 2059/0239* (2013.01)

(58) Field of Classification Search
CPC ...... F16H 59/044; F16H 63/50; F16H 63/502; F16H 2059/0239; F16H 2059/026; F16H 2059/0234; B62M 25/06; F02D 41/023; B62K 23/08; B60W 2710/0666; B60Y 2200/12

See application file for complete search history.

(56) References Cited

U.S. PATENT DOCUMENTS 7,846,062 B2 * 12/2010 Watanabe ............. B60W 10/06
477/107
2008/0099268 A1 5/2008 Hiroi
2008/0115984 A1 5/2008 Watanabe

FOREIGN PATENT DOCUMENTS

DE 10 2010 015 036 A1 10/2011
DE 10 2010 015 037 A1 10/2011
(Continued)

*Primary Examiner* — Victor L MacArthur
(74) *Attorney, Agent, or Firm* — Rod D. Baker (57) ABSTRACT

An apparatus and system for actuating a manual gearbox, particularly of a motorcycle having a drive engine, and for carrying out a gear change while the clutch is engaged between the drive engine and the manual gearbox. The apparatus has a selector shaft, which can be actuated rotationally, and a gear-selector drum, which can be actuated rotationally. The gear-changing apparatus has a gear-change lever provided for actuating the selector shaft, and is adapted for influencing the output torque of the drive engine. One or more magnetic sensor(s), such as Hall effect sensors, are provided for sensing rotational actuation of the selector shaft and, optionally, for sensing rotational actuation of the gear selector drum. The sensor(s) send a signal to a controller and mechanisms known for affecting a change in gear to a lower or higher gear.

16 Claims, 4 Drawing Sheets

(51) Int. Cl.
*B62K 23/08* (2006.01)
*F16H 63/50* (2006.01)
*B62M 25/06* (2006.01)
*F02D 41/02* (2006.01)
*F16H 59/02* (2006.01)

(56) References Cited

FOREIGN PATENT DOCUMENTS

| | | | |
|---|---|---|---|
| DE | 10 2012 209 720 A1 | 12/2013 | |
| DE | 10 2012 209 963 A1 | 12/2013 | |
| DE | 10 2005 017 237 B4 | 3/2014 | |
| GB | 2504835 A * | 2/2014 | ............. B62K 23/08 |
| JP | 2008 144756 A | 6/2008 | |
| JP | 2014 190281 A | 6/2014 | |

* cited by examiner

FIG. 4

GEAR-CHANGING APPARATUS FOR ACTUATING A MANUAL GEARBOX OF A MOTORCYCLE FOR CARRYING OUT A GEAR CHANGE WITH THE CLUTCH ENGAGED

CROSS-REFERENCE TO RELATED APPLICATIONS

This application claims the filing benefit of, and priority to, German Patent Application No. DE 10 2015 114 338.0 filed on 28 Aug. 2015, the entire disclosure of which is incorporated herein by reference.

BACKGROUND OF THE INVENTION

Field of the Invention

The present invention relates to a gear-changing apparatus. The apparatus preferably is for actuating a manual gearbox of a motorcycle having a drive engine, for carrying out a gear change with clutch engaged between the drive engine and the manual gearbox.

Background Art

In a motorcycle gearbox, gear changing usually proceeds such that the rider of the motorcycle interrupts the torque transmission between the drive engine and the manual gearbox by disengaging the clutch and then actuating the gear-change lever, which is coupled to the selector shaft, using his or her foot for changing up or changing down, and the rider then engaging the clutch again. The clutch typically is operated by pulling and releasing a clutch handle.

Although this procedure is still customary as before, gear-changing devices have also already become known which allow the gear changing of the manual gearbox with the clutch engaged. Such gear-changing devices are usually termed shifting assistance systems. These shifting assistance systems have the advantage that the time period during which the output torque provided by the drive engine for accelerating the motorcycle is interrupted can be reduced. The reduction in interruption time is advantageous in the case of sports motorcycles or racing motorcycles in particular. Gear changing without requiring the rider to actuate the clutch is also of interest for tour riding however, as the rider's clutch hand can be relieved as a result, particularly when riding for long distances; this contributes to relaxed and comfortable riding.

A motorcycle gear-change mechanism with a shifting assistance system for changing gear without actuating the clutch has become known on the basis of German Patent Publication DE 10 2012 209 963 A1. The shifting assistance system that has become known on the basis of this published document has a spring storage unit, which experiences a change in pre-stress due to the actuation of the gear-change lever. The change to a different gear is initiated and carried out by means of the energy stored in the spring. The shifting assistance system is placed concentrically onto the selector shaft of the gearbox in this case and protrudes laterally from the same.

A movement of the gear-change lever is transferred to the shifting assistance system in the process, and leads to a change of the spring pre-stress of the spring storage unit. Using the energy stored in the spring, the gear change process is then supported, wherein a sensor is provided on the housing of the shifting assistance system to detect the rider's desire to change gear, which determines the position of the gear-change lever, which is used in turn in a corresponding actuation by means of the rider for detecting the increased spring pre-stress of the spring storage unit of the shifting assistance system.

A gear-changing device for motorcycles has become known from German Patent Publication DE 10 2010 015 037 A1, which has a gear-change force transmission device, which is arranged between a gear-change lever of the motorcycle and a selector shaft of the gearbox. The force transmission device has two pressure springs, which are pre-stressed by means of a corresponding actuation of the gear-change lever during a gear-change process that is to be carried out. In this case, the two pressure springs have different spring characteristics, which means that the detection of the spring travel covered during the actuation of the gear-change lever in each case leads to different spring forces. The spring force generated in each case is monitored by an electronic device and evaluated to see if a gear-change force threshold has been reached, wherein the engine torque output by the drive engine is reduced and a gear-change process is carried out after the respective gear-change force threshold has been exceeded. Reaching the gear-change force threshold is therefore evaluated or interpreted as the rider's desire to change gear, whereupon the engine torque is reduced, in order to be able to carry out the actual gear change.

A gear-changing device very similar to the previously described gear-changing device has become known from German Patent Publication DE 10 2010 015 036 A1. Instead of operating with two pressure springs however, this device operates with only one pressure spring that is loaded in both gear-change directions. The rider's desire to change gear is determined in that the pre-stress force of the spring generated by means of the actuation of the gear-change lever is monitored for a gear-change force threshold; or, the spring travel covered by the spring for the actuation of the gear-change lever is detected by means of a sensor device and converted into a gear-change force threshold, which when exceeded is then interpreted as the rider's desire to change gear. If the gear-change force threshold is exceeded, the engine torque is reduced for carrying out the actual gear change process.

The aforementioned patent publications offer helpful background for the present invention. Accordingly, they are incorporated herein by reference in their entireties.

The commonality for all of the aforementioned gear-changing devices is that they have a spring in the force transmission path between the gear-change lever and the gearbox input, which spring is pre-stressed by a corresponding actuation of the gear-change lever by the rider of the motorcycle. The spring force thus generated by the rider when initiating a gear-change process is then evaluated as a signal for the short-term reduction of the engine torque after the exceedance of a corresponding threshold value, or else used as stored energy for carrying out the actual gear-change process.

Therefore, in all the above cases and commonly in the art, a spring device is located in the force transmission path between the gear-change lever and the gearbox input of the motorcycle gearbox, which spring device is actuated in such a manner when the gear-change lever is actuated, that it performs spring work; that is to say, the spring path of the spring present in the non-actuated position of the gear-change lever is subjected to a change. However, the presence of the spring device in the force-transmission path leads in all cases to a change of the gear-change behaviour perceived by the rider of the motorcycle, compared to a gear-change process in which a spring does not have to be pre-stressed in the force-transmission path first.

The spring leads to a gear-change behaviour that is perceived by the rider as indifferent or spongy. As a result, the spring makes it difficult for the rider to find neutral in particular, i.e., finding the neutral position for the motorcycle gearbox. The shifting assistance systems mentioned have a complex and therefore expensive structure, and are susceptible to faults. Spring fracture, for example, may occur at any time, whereupon the functioning of the shifting assistance system is no longer ensured and the vehicle equipped therewith can no longer be used until after a corresponding repair has been carried out. Furthermore, a spring is subject to signs of fatigue and set values, which change the gear-change behaviour of a shifting assistance system (provided with a spring) over a relatively long operating period, to which the rider must in turn adapt.

Shifting assistance systems also already have become known, which operate without a spring in the force transmission path between gear-change lever and selector shaft. These systems make use of a measurement of the force, using which the rider of the motorcycle actuates the gear-change lever. To trigger the gear-change process by influencing the engine torque, a set threshold value must be exceeded by the measured force value. If this threshold value is set to be high, the rider must actuate the gear-change lever with a high force, so that they can change gear, which has a tiring effect on the rider, if the threshold value is set to be low, even a brief inadvertent touch of the gear-change lever by the rider causes the threshold value to be exceeded and therefore an undesired gear-change process, which constitutes an unpleasant surprise for the rider. Shifting assistance systems of this type, which usually operate using load cells or strain gauges, are typically offered by Translogic Systems Ltd., for example. This description makes it clear that the rider must in turn adapt to the triggering behaviour of the shifting assistance system.

On this basis, it is the object of the present invention to create a gear-changing device for changing gear without actuating the clutch on a motorcycle, which makes it possible for a rider to use the motorcycle without the rider's having to adapt to a changed gear-changing behaviour. To achieve this object, the invention has the features specified in claim 1. Advantageous embodiments are disclosed in the further claims.

BRIEF SUMMARY OF THE INVENTION

There is provided hereby an apparatus and system for actuating a manual gearbox, particularly of a motorcycle having a drive engine, for carrying out a gear change while the clutch is engaged between the drive engine and the manual gearbox. The apparatus has a selector shaft, which can be actuated rotationally, and a gear-selector drum, which can be actuated rotationally. The gear-changing apparatus has a gear-change lever provided for actuating the selector shaft, and is adapted for influencing the output torque of the drive engine. According to the invention, special magnetic means, such as Hall effect sensor(s), are provided for sensing rotational actuation of the selector shaft and, optionally but preferably, for sensing rotational actuation of the gear selector drum; the sensor(s) means then send a signal to a controller and mechanisms known for affecting a change in gear to a lower or higher gear.

BRIEF DESCRIPTION OF THE SEVERAL VIEWS OF THE DRAWING

The invention is explained in more detail hereinafter on the basis of the drawing. In the figures.

Figure 1:
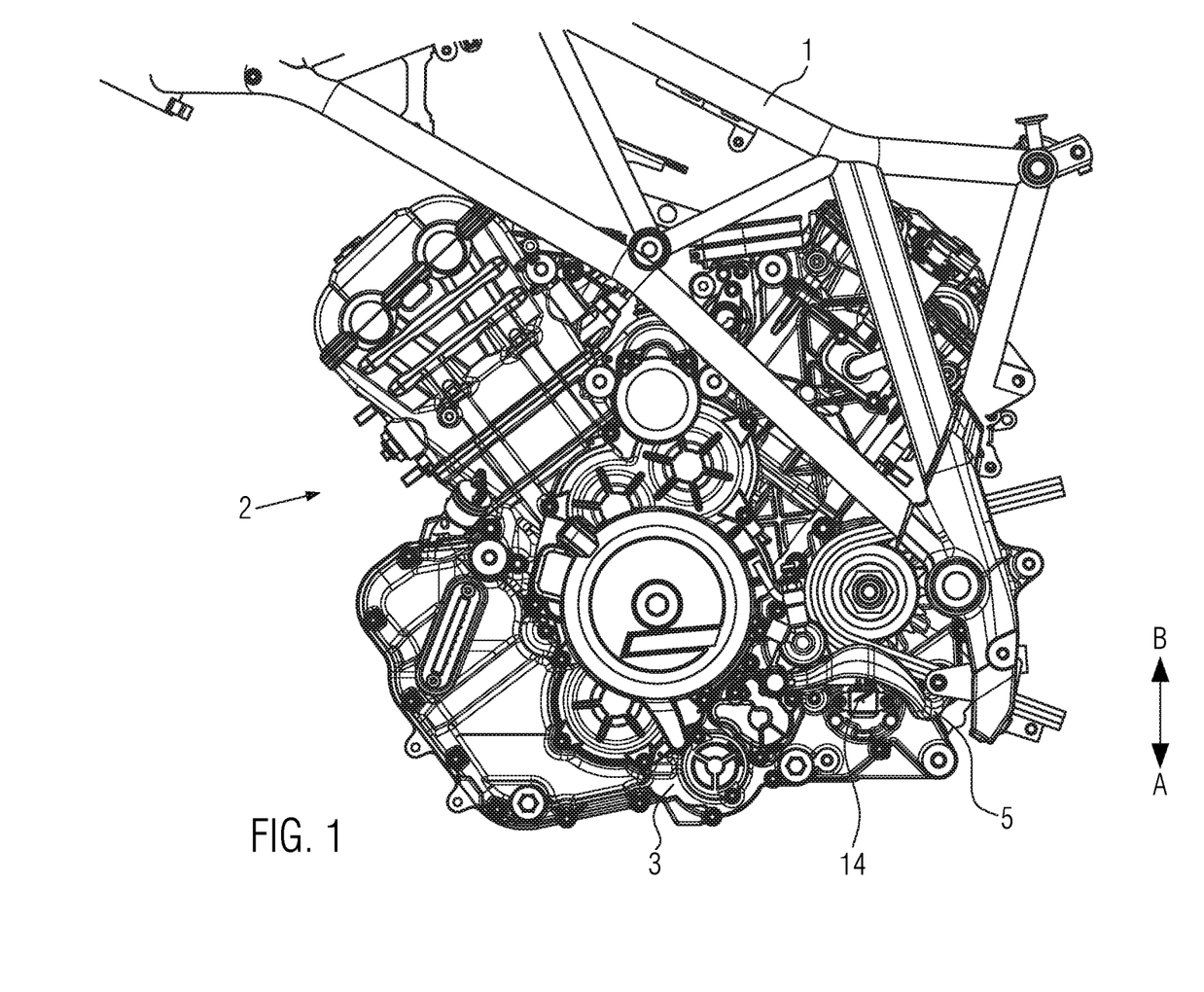
FIG. 1 shows a side view onto a motorcycle frame with a two-cylinder engine in a "V" arrangement, and a gear-change lever arranged directly on the selector shaft and gear-selector-drum sensor which can be seen behind the same.

FIG. 1 of the drawing shows a side view onto an illustration with a motorcycle frame 1 and a drive engine 2 in the form of a V engine. Further details of the overall motorcycle, such as for example a front wheel and a rear wheel and a motorcycle saddle and the like, have been omitted from the drawing for reasons of simplifying the illustration, as components of this type on a motorcycle are assumed to be usually present.

DETAILED DESCRIPTION OF EMBODIMENTS OF THE INVENTION

The present invention creates a gear-changing apparatus for actuating a manual gearbox of a motorcycle having a drive engine. The apparatus is devised for carrying out a gear change with the clutch engaged between drive engine and manual gearbox; the apparatus includes a selector shaft, which can be actuated rotationally (i.e., is rotationally actuable), and a gear-selector drum, which also can be actuated rotationally (is rotationally actuable). The gear-changing apparatus has a gear-change lever provided for actuating the selector shaft, and is adapted for influencing the output torque of the drive engine. The gear-changing apparatus has a first sensor device detecting the rotational actuation of the selector shaft, and is constructed for influencing the output torque of the drive engine as a function of a sensor signal of the first sensor device.

In contrast with known shifting assistance systems (which detect the actuation force with which the rider of the motorcycle actuates the gear-change lever, with a sensor device as a reference for the detection of a rider-side desire to change gear, or which detect the actuation path of the gear-change lever for detecting the desire to change gear using a sensor device), it is provided according to the present disclosure to provide a first sensor device for detecting the rotational actuation of the selector shaft, and to provide a gear-changing apparatus in such a manner that it influences the engine torque on the basis of the sensor signal from the first sensor device, i.e., of the selector-shaft angle sensor.

Thus, the requirement to detect and monitor a force threshold, which is exceeded if the rider has actuated the gear-change lever with a holding pressure, is eliminated. The value of this force threshold can be higher than the value of the force that the rider exerts habitually for the gearbox actuation, which for the rider leads to an unfamiliar transition to an actuation of the gear-change lever which conforms to the force threshold. This disadvantage is avoided by means of the construction of the gear-changing apparatus in accordance with the present disclosure.

Also, the disadvantage of prior arts having an indifferent, spongy actuation of the gear-change lever is prevented, as a spring, which leads to such an actuation, in the force-transmission path between the gear-change lever and gearbox input is dispensed with; there is also no longer a requirement for detecting the actuation force used by the rider to actuate the gear-change lever. This is achieved in that the rider's desire to change gear can be detected directly by detecting the rotary angle of the selector shaft (or a change in the rotary angle) using the first sensor device. The rider's desire to change gear is no longer detected by detecting a pre-stored measured value, such as a spring force, or the detection of the actuation force of the selector shaft by means of a load cell. Accordingly, a rider's desire to change gear may be detected when the actuation force leading to a gear change is not applied to the selector shaft by means of a gear-change lever for actuation by means of the rider's foot—which, although it is present, is not actuated in some situations—but rather by means of a different device provided on the motorcycle. This different device is actuated manually, for example similarly to a device for optional manual actuation of the motorcycle's rear wheel brake, which is just one of the advantages of the gear-changing apparatus according to the present disclosure.

It is provided according to a further development of the apparatus of this disclosure that the gear-changing apparatus has a second sensor device for detecting the rotational actuation of the gear-selector drum, and the gear-changing apparatus is adapted for influencing the output torque of the drive engine as a function of a sensor signal of the second sensor device. A second sensor signal output by the second sensor device is available, which second signal may be functionally coupled to the first sensor signal, which is provided by the first sensor device, in such a manner that the engine torque output by the engine can be influenced by means of the gear-changing apparatus according to this disclosure. This influence can, for example, be used such that the gear-changing apparatus according reduces the engine torque for carrying out the gear-change process, which can take place on the basis of the first sensor signal provided by the first sensor device. The gear-changing apparatus then increases the engine torque on the basis of the second sensor signal provided by the second sensor device, wherein the rotary angular position of the gear-selector drum is detected by means of the second sensor device for this purpose; it is detected on the basis of the rotary angular position that the gear-change process is finished and the engine torque can be increased again.

It is also provided according to a further development of the presently disclosed apparatus and system that the gear-change lever is coupled in a positive-fitting manner to the selector shaft for transmitting gear-change force to the selector shaft. Alternatively, the gear-change lever is connected to the selector shaft by the operable interposition of a force transmission device, such as mechanical linkages known in the art. Both configuration possibilities are taken into account in this manner, namely that the gear-change lever is fixed on an end-face of the selector shaft, or for example is coupled in a force-fitting manner to the end-face end of the selector shaft using a gear-change lever relay mechanism.

It is provided according to a further development of this apparatus and system that the gear-change force-transmission path between the gear-change lever and the selector shaft is free from any spring-type device that can be deformed by means of the gear-change force. In other words, in both cases of the coupling of the gear-change lever to the selector shaft (i.e., a positive-fitting attachment of the gear-change lever on the selector shaft, and a force-fitting connection of the gear-change lever to the selector shaft by means of a gear-change lever relay mechanism), it is possible to dispense with a spring device arranged in the gear-change force-transmission path. Thus, the gear-changing apparatus according to this disclosure stands out due to the advantage that an indifferent and spongy gear-change feel created by the spring device in the gear-change force transmission path can be prevented, and in particular finding neutral is not impaired by such a spring device.

It is also provided according to a further development of the present apparatus and system that the selector shaft is provided at an end-face end portion with a support bearing, which is formed as a cylindrical body and is detachably fixed on the selector shaft and has a mounting for detachable fastening of a magnetic device. Using this body (that is formed from a plastic material for example), a function integration is therefore achieved such that the cylindrical body functions simultaneously as an axial bearing for the mounting of the selector shaft in the engine housing or gearbox housing, and as a mounting for the arrangement of a permanent magnet in the mounting, which interacts with the first sensor device, which is arranged outside of the engine housing or gearbox housing (for example).

Also, it is provided according to a further development of the present apparatus and system that the gear-selector drum has a recess in the region of an end thereof, in which a magnetic device is arranged. The magnetic device can be a permanent magnet, the rotary angular position of which is detected by means of the second sensor device for providing the second sensor signal, and preferably which is arranged outside of the engine housing or the gearbox housing.

The first and/or second sensor device may be constructed or formed as including operating Hall effect sensors, which interact contactlessly with the magnetic device arranged on the selector shaft or the magnetic device arranged on the gear-selector drum, in order to detect the relative rotary angular positions of the selector shaft and the gear-selector drum, and provide the first and the second sensor signals in this manner.

Finally, it is also provided according to a further development of the present apparatus and system that the gear-changing apparatus is constructed for changing the gear of the manual gearbox, with the clutch engaged and engaged gear in both gear-changing directions. In other words, this means that changing up to a higher gear and changing down to a lower gear is possible with the clutch engaged, by means of the gear-changing apparatus according to this disclosure, without the rider of the motorcycle having to actuate the clutch therefore.

Attention is invited to the drawing figures. The drive engine 2 has a manual gearbox 4 arranged in the engine housing 3, a few components of which gearbox 4 can be seen in FIG. 3 of the drawing. Furthermore, the motorcycle (which is not illustrated in any more detail) has a gear-change lever 5, which is provided for the rider of the motorcycle to actuate the manual gearbox 4. For this purpose, the rider can actuate the gear-change lever 5 using his or her left foot (in the embodiment illustrated); gear change levers, in general, are known. In this embodiment, the rider actuates the gear-change lever 5 in the direction of the arrow A according to FIG. 1, for changing gear down, and in the direction of the arrow B (also according to FIG. 1) for changing gear up.

Gear-change lever 5 (labelled in FIG. 1) is operatively associated with the selector shaft 6 (seen in FIG. 3), such that actuation of the gear-change lever 5 assures that the selector shaft 6 is rotationally actuated through a predetermined rotary angle or pivot angle. Such rotational actuation ultimately results in the gear (which is engaged prior to the rider's rotary actuation of the selector shaft 6) being changed; specifically in the direction of a higher gear or in the direction of a lower gear, depending on the direction of actuation of the gear-change lever 5.

Figure 3:
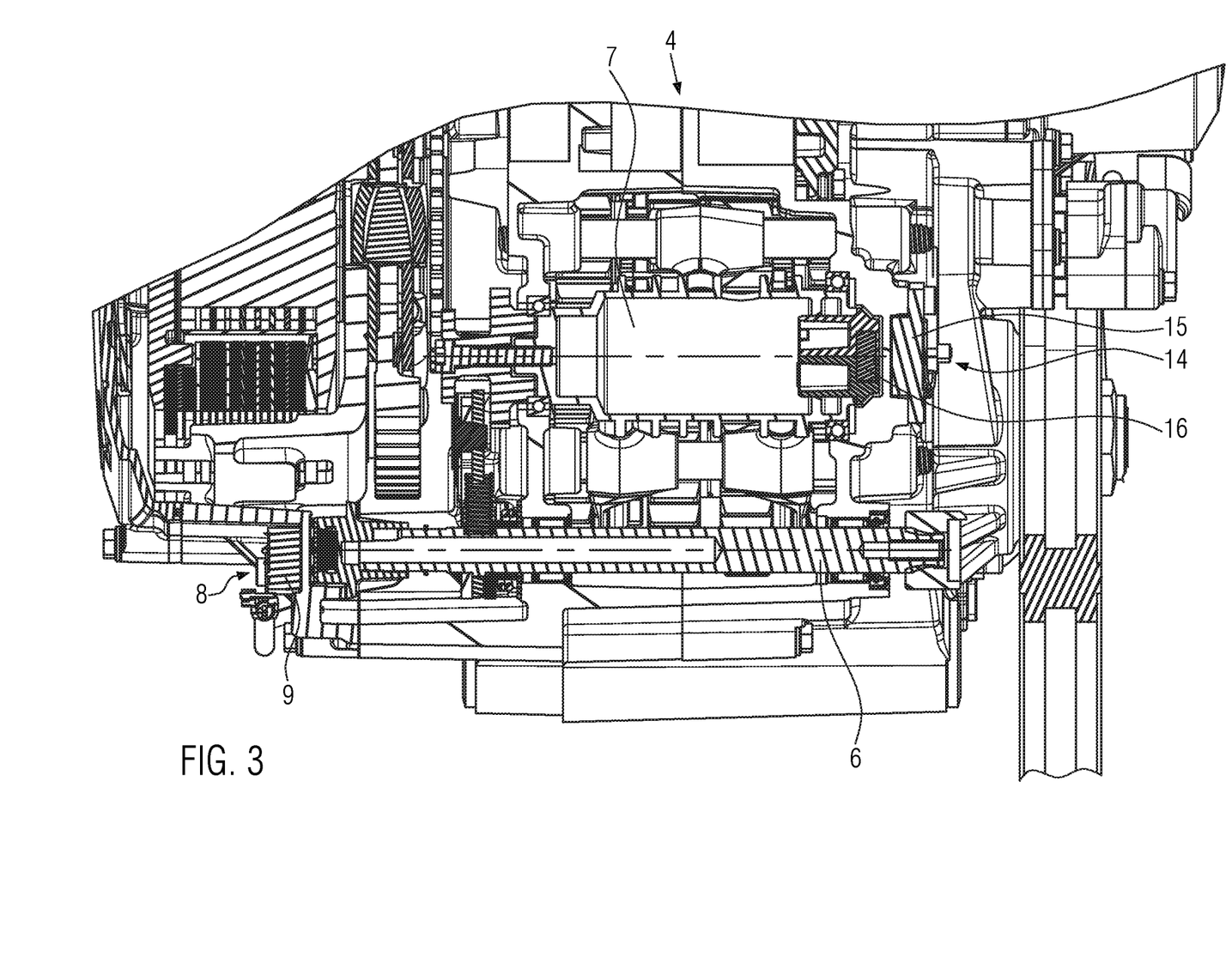
FIG. 3 provides a sectional view of an apparatus according to the present invention, taken along the sectional plane III-III seen in FIG. 2, and extends through a part of the drive engine, and the side view shows a view onto the sectional plane from below.

Reference is invited to the detail of FIG. 3. The rotary actuation of the gear-change lever 5 causes a rotary actuation of the gear-selector drum 7, on the outer circumference of which gear-selector drum sliding-block guides are formed, which are engaged with selector forks which are likewise not illustrated in any more detail, so that by means of a rotary actuation of the gear-selector drum 7 by a predetermined rotary angle or pivot angle, the selector forks are axially displaced. Axial displacement of the selector forks can axially displace gear wheels, which gear wheels are axially displaceable but rotationally-fixedly mounted on gearbox shafts. The gear wheels have shifting dogs at the side flanks thereof, and thus can produce the power flow (to the drive train) by means of the engagement of the shifting dogs, or can interrupt the power flow by releasing such engagement.

The pivotal movement or actuation of the gear-change lever 5 by the rider of the motorcycle therefore leads in each case to a rotary actuation of the selector shaft 6 by a certain rotary angle or pivot angle, and to a rotary actuation of the gear-selector drum 7 by a certain drum rotary angle or pivot angle. Even in the case of the force-fitting coupling of the selector shaft 6 with a gear-change lever 5 by means of a lever gear, or a relay mechanism (which is not illustrated in any more detail), the rider's actuation of the gear-change lever 5 induces to a rotary actuation of the selector shaft 6 and the gear-selector drum 7. Both configuration possibilities are taken into account in this manner, namely, that the gear-change lever 5 is fixed on an end-face end of the selector shaft 6, or for example is coupled in a force-fitting manner to the end-face end of the selector shaft using a gear-change lever relay mechanism (such relay mechanisms, for operably linking a gear-change lever to a selector shaft, are known in the art). The end-face end portion of the selector shaft 6 is the end portion of the selector shaft seen in FIG. 4, being disposed proximately to the support bearing 12A; in a preferred embodiment, it is generally opposite the Hall effect sensor 9 seen in that figure.

Thus, if the rider of the motorcycle would like to carry out a gear-change process, then he actuates the gear-change lever 5 and also the gear-selector drum 7 both for changing down and for changing up.

Figure 2:
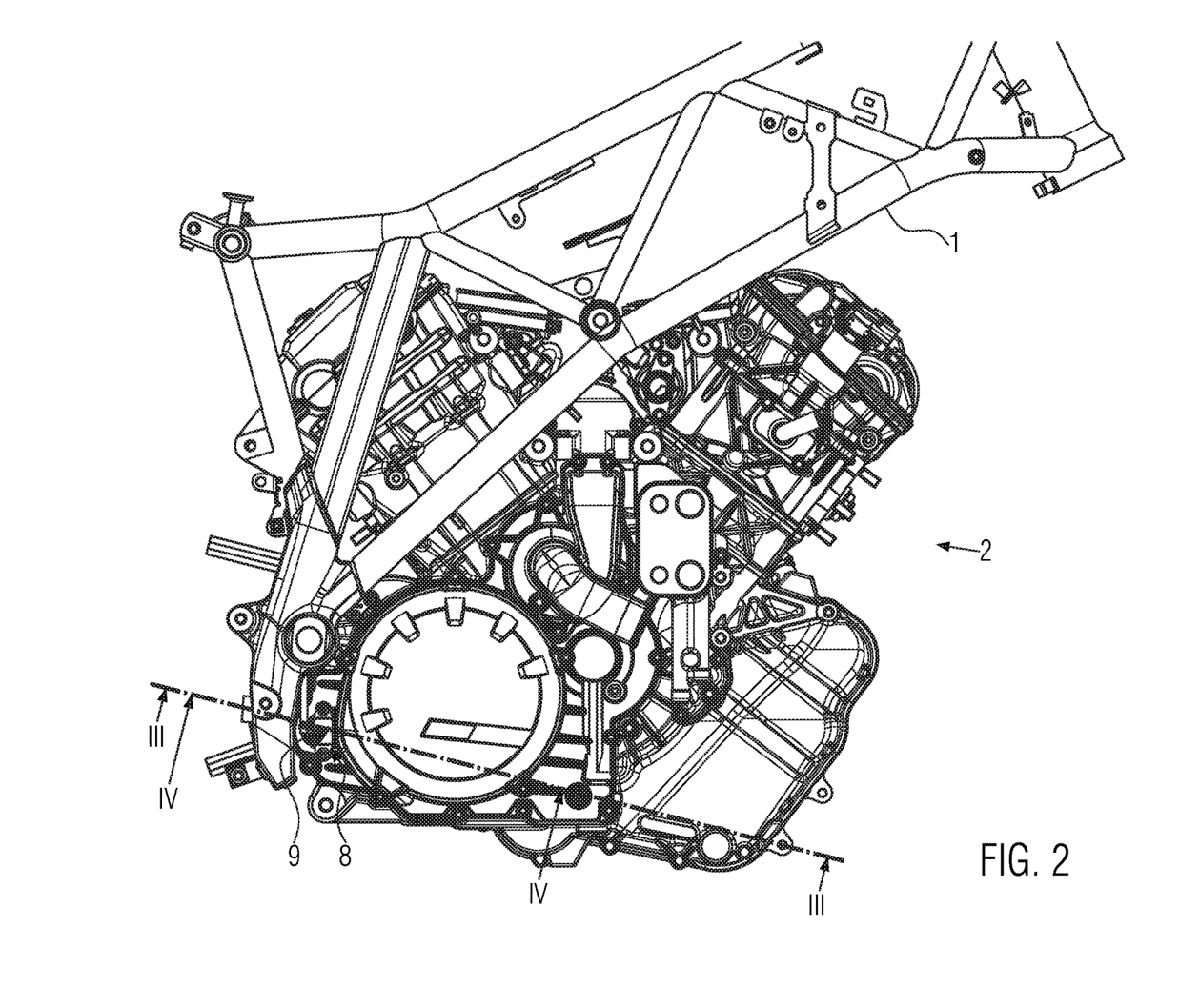
FIG. 2 shows a side view onto the motorcycle frame from the other side.

The gear-changing apparatus according to the invention for actuating the manual gearbox 4 has a first sensor device designated with the reference number 8 in FIG. 3 of the drawing. The first sensor device 8 is arranged or fastened externally on the engine housing 3 (i.e., the sensor device is on the outside of the housing)—as also seen in FIG. 2 of the drawing—and which preferably is a Hall effect sensor 9 in the embodiment illustrated.

Figure 4:
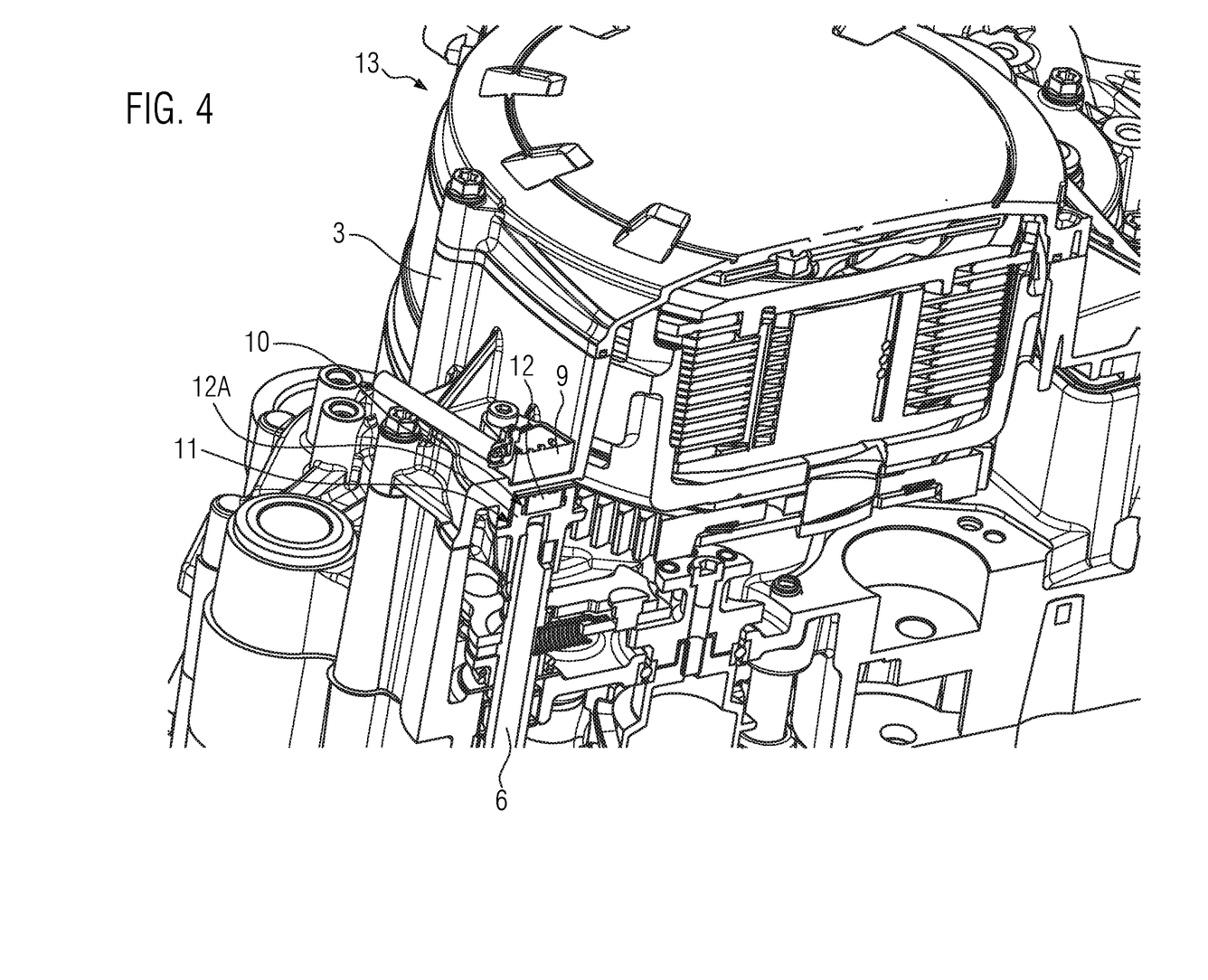
FIG. 4 provides a sectional view of an apparatus according to the present invention, in accordance with the sectional plane IV-IV seen in FIG. 2.

The arrangement of the Hall effect sensor 9 is revealed in more detail with reference to FIG. 4 of the drawing. FIG. 4 shows the Hall effect sensor 9 arranged externally on the outside of engine housing 3 in a manner such that the sensor 9 is arranged opposite a mounting 10. The mounting 10 is formed on a body 11 fabricated from a plastic material; the body 11 is constructed to simultaneously define a support bearing 12A for the axial and radial guiding of the selector shaft 6. A magnetic device preferably in the form of a permanent magnet 12 is arranged on or in the mounting 10, so that the rotary angle or the pivot angle movement of the selector shaft 6 (which is set by the rider due to a rotary actuation of the gear-change lever 5) is detected by the Hall effect sensor 9 and is available as a first sensor signal.

Accordingly, if the rider of the motorcycle initiates a gear-change process by means of a corresponding deliberate actuation of the gear-change lever 5, then the change of the rotational position of the selector shaft 6 is detected by the first sensor device 8, which first sensor device provides a sensor signal. The sensor signal is detected by a control device or regulating device of the gear-changing apparatus (not illustrated in any more detail; typically an on-board digital processor). The control device or regulating device subsequently controls the drive engine 2 in such a manner that the engine torque output is reduced, after which a gear-change process can executed without the clutch 13 of the drive engine 2, which clutch 13 is shown generally in FIG. 4 of the drawing, having to be actuated by the rider. The lever actuation force applied by the rider, by actuating the gear-change lever 5 (in the manner that is known), simultaneously provides the gear-change force for the gear-change process, without the rider having to particularly adapt to the gear-changing apparatus according to this disclosure, that is to say, without the rider having to change her or his gear-change behaviour. The actuation of the gear-change lever 5 by the rider also results in the gear-selector drum 7 being pivoted, or rotationally actuated, by a certain rotary angle or pivot angle, due to the gear-change force exerted by the rider.

In an embodiment of the gear-changing apparatus, the gear-selector drum 7 defines a recess in an end portion (e.g., the drum end toward the right side of FIG. 3) in which recess a magnetic device 16 is arranged or disposed. The rotary actuation of the gear-selector drum 7 is detected by a second sensor device 14, as also seen in FIG. 1. The second sensor device 14 preferably includes a Hall effect sensor 15. The second sensor device 14, or at least the Hall effect sensor 15 thereof, may be fastened or otherwise disposed on the outside of the engine housing 3. The second sensor device 14 determines the change in the rotary angle position of the gear-selector drum 7, specifically by means of the interaction of the Hall effect sensor 15 with a permanent magnet 16 arranged at the nearby end of the gear-selector drum 7. A rotary actuation of the gear-selector drum 7 therefore induces a change of the magnetic field built up by the permanent magnet 16, which change is detected by the Hall effect sensor 15. The detected change generates a second sensor signal, which second sensor signal is detected and evaluated by the control device or regulating device of the gear-changing apparatus (which is not illustrated in any more detail). This second sensor signal can likewise be processed for influencing the torque output by the drive engine 2, by the second sensor signal alone or in addition to the first sensor signal, to terminate the reduction of the engine torque or to increase again the engine torque.

The gear-changing apparatus according to the present disclosure for changing gear of the manual gearbox, without actuating the clutch of the motorcycle, therefore stands out in that (in contrast with known shifting assistance systems), there is no spring device, which can be changed by the gear-change force of the rider, present in the force-transmission path between the gear-change lever and the selector shaft. The rider of the motorcycle therefore also does not have to adapt to a gear-change behaviour that is changed by the effects of such a spring. Also, the actuation force applied to the gear-change lever by the rider for changing the gears of the gearbox does not have to be detected and evaluated, and accordingly a load cell or similar force-detecting device also does not have to be attached to the motorcycle for detecting the actuation force. Again, a benefit of the present system is that gear-change force-transmission path (any direct filling, or a linkage mechanism) between the gear-change lever and the selector shaft is free from a spring device deformable by a gear-change force. The present gear-changing apparatus accordingly is marked by its relative simplicity and ease of use by the rider because the present apparatus lacks a spring device in the force-transmission path between the gear-change lever 5 and the selector shaft 6.

Thus the rider's desire to change gear is detected and recognised by means of the rotary actuation of the selector shaft by means of the first sensor device, which interacts with the selector shaft, and the engine torque of the drive engine can subsequently be reduced for carrying out the gear-change process, wherein the second sensor signal of the second sensor device, which interacts with the gear-selector drum, can also additionally be evaluated to detect the desire to change gear. One or both sensor signals can then be used for corresponding control of the drive engine for reducing the drive torque for carrying out the gear-change process or for building up the drive torque again.

The gear-changing apparatus according to this disclosure also has the advantage compared to the known shifting assistance systems, that the gear-changing apparatus works in a wear-free manner; a small force, which is known for the rider, for actuating the gear-change lever is sufficient in order to initiate and carry out the gear-change process without actuating the clutch of the motorcycle, as no spring device in the force-transmission path between the gear-change lever and selector shaft needs to be tensioned using the actuation force acting on the gear-change lever. The gear-lever actuation has the familiar-feeling feedback for the rider of the motorcycle, even when using the gear-changing apparatus according to the invention. Thus the rider does not have to adapt to a changed gear-changing behaviour, as no torsion device or pressure spring—which causes a spongy and indifferent gear-change feel—is present in the system.

Due to the absence of such a spring device, finding the neutral position of the manual gearbox by the rider is not impaired, as is the case in known shifting assistance systems. Further the gear-selector drum sensor may also be called upon to determine the completed gear change, so that the manual gearbox of the motorcycle is protected and the engine torque is only built up again when this is possible at a time that is harmless for the manual gearbox. As the requirement for attaching a force-measuring device (functionally coupled to the gear-change lever) to the motorcycle is dispensed with, the requirement for wiring the force-measuring device for power supply and signal transmission to a control device on the motorcycle also is dispensed with, and the design of the motorcycle with shifting assistance system is simplified. Regarding features of the invention not explained in more detail above, reference is otherwise expressly made to the patent claims and the drawing.

NUMERAL REFERENCE LIST

1. Motorcycle frame
2. Drive engine
3. Engine housing
4. Manual gearbox
5. Gear-change lever
6. Selector shaft
7. Gear-selector drum
8. First sensor device
9. Hall effect sensor
10. Mounting
11. Body
12. Permanent magnet
12A. Support bearing
13. Clutch
14. Second sensor device
15. Hall effect sensor
16. Permanent magnet Although the invention has been described in detail with particular reference to these preferred embodiments, other embodiments can achieve the same results. Variations and modifications of the present invention will be obvious to those skilled in the art, and it is intended to cover in the appended claims all such modifications and equivalents.

What is claimed is:

1. A gear-changing apparatus for actuating a manual gearbox of a motorcycle having a drive engine, and for carrying out a gear change with a clutch engaged between the drive engine and the manual gearbox, the gear-changing apparatus comprising a gearbox comprising a rotationally actuable selector shaft and a rotationally actuable gear-selector drum, and the gear-changing apparatus comprising a gear-change lever for actuating the selector shaft, wherein the gear-changing apparatus is adapted for influencing the output torque of the drive engine, the gear-changing apparatus further comprising a first sensor device for detecting the rotational actuation of the selector shaft, and a support bearing provided at an end-face end portion of the selector shaft, the support bearing comprising a cylindrical body detachably fixable on the selector shaft, and the body having a mounting for detachable fastening thereon of a first magnetic device, and wherein the gear-changing apparatus is adapted for influencing the output torque of the drive engine as a function of a sensor signal from the first sensor device.

2. The gear-changing apparatus according to claim 1 further comprising a second sensor device for detecting the rotational actuation of the gear-selector drum, wherein the gear-changing apparatus is adapted for influencing the output torque of the drive engine as a function of a sensor signal of the second sensor device.

3. The gear-changing apparatus according to claim 2, wherein the drive engine comprises a housing, and the first sensor device and/or the second sensor device is fastened externally on the housing.

4. The gear-changing apparatus according to claim 2, wherein the first sensor device and/or second sensor device comprises a Hall effect sensor.

5. The gear-changing apparatus according to claim 2, wherein the gear-change lever is coupled in a positive-fitting manner to the selector shaft for transmitting a gear-change force to the selector shaft, or is connected to the selector shaft with the interposition of a force transmission device.

6. The gear-changing apparatus according to claim 2, wherein a gear-change force-transmission path between the gear-change lever and the selector shaft is free from a spring device deformable by a gear-change force.

7. The gear-changing apparatus according to claim 2, wherein the apparatus is adapted for changing the gear of the manual gearbox, in either gear-changing direction, with the clutch engaged.

8. The gear-changing apparatus according to claim 1, wherein the gear-change lever is coupled in a positive-fitting manner to the selector shaft for transmitting a gear-change force to the selector shaft, or is connected to the selector shaft with the interposition of a force transmission device.

9. The gear-changing apparatus according to claim 8, wherein a gear-change force-transmission path between the gear-change lever and the selector shaft is free from a spring device deformable by a gear-change force.

10. The gear-changing apparatus according to claim 8, wherein the drive engine comprises a housing, and the first sensor device is fastened externally on the housing.

11. The gear-changing apparatus according to claim 8, wherein the first sensor device comprises a Hall effect sensor.

12. The gear-changing apparatus according to claim 1, wherein a gear-change force-transmission path between the gear-change lever and the selector shaft is free from a spring device deformable by a gear-change force.

13. The gear-changing apparatus according to claim 12, wherein the drive engine comprises a housing, and the first sensor device is fastened externally on the housing.

14. The gear-changing apparatus according to claim 13, wherein the first sensor device comprises a Hall effect sensor.

15. The gear-changing apparatus according to claim 1, wherein the gear-selector drum defines a recess in an end thereof, in which recess a second magnetic device is arranged.

16. The gear-changing apparatus according to claim 1, wherein the apparatus is adapted for changing the gear of the manual gearbox, in either gear-changing direction, with the clutch engaged.

* * * * *